United States Patent [19]

Hemmings

[11] Patent Number: 4,531,869
[45] Date of Patent: Jul. 30, 1985

[54] RETRACTABLE TIE-DOWN DEVICE

[75] Inventor: Davis L. Hemmings, Oakland, Mich.

[73] Assignee: The United States of America as represented by the Secretary of the Army, Washington, D.C.

[21] Appl. No.: 616,632

[22] Filed: Jun. 4, 1984

[51] Int. Cl.³ .............................................. B60P 7/08
[52] U.S. Cl. .................................... 410/107; 410/111
[58] Field of Search .............. 410/107, 106, 108, 110, 410/111, 101, 96; 24/115 K, 288

[56] References Cited

U.S. PATENT DOCUMENTS

| | | | |
|---|---|---|---|
| Re. 19,337 | 8/1931 | Butterworth | 105/368 |
| 2,688,504 | 3/1952 | Parker | 287/20.5 |
| 2,811,116 | 10/1957 | Williamson | 410/107 |
| 3,021,799 | 2/1962 | Oakley | 105/369 |
| 3,102,708 | 9/1963 | Crain | 410/107 |
| 3,259,353 | 7/1966 | Webb | 24/115 K X |
| 3,377,039 | 6/1966 | Hays | 248/119 |
| 4,072,113 | 2/1978 | Thurston | 410/107 |

*Primary Examiner*—Harry Tanner
*Attorney, Agent, or Firm*—Peter A. Taucher; Gail S. Soderling; Robert P. Gibson

[57] ABSTRACT

An improved storable tie-down device. The tie-down device has a center bar with a pair of spared, parallel V-shaped arms extending from the center bar. A mounting arm extends outward from the V-shaped legs. A housing located below the surface of a frame holds the mounting arms so that the tie-down device can be rotated from a retracted storage position to an active attachment position.

8 Claims, 4 Drawing Figures

RETRACTABLE TIE-DOWN DEVICE

GOVERNMENT INTEREST

The invention described herein may be manufactured, used, and licensed by or for the Government for governmental purposes without payment to me of any royalty thereon.

BACKGROUND

In one aspect this invention relates to cargo retaining systems. In a further aspect this invention relates to the clamps attached to a cargo trailer for use with cargo tie-down straps or chains.

The trailers used in trucking generally consist of a flat platform made of wood or metal surrounded by a frame of box beams having a hollow interior, the platform being mounted on a number of axles.

To hold loads in place and prevent cargo slippage, tie-down straps or chains are attached to the frame of the trailer and either attached to the load or another point on the frame and sufficient tension applied to the tie-down to prevent cargo motion. The tie-downs are generally attached to some form of tie-down ring or anchor which is firmly attached to the frame.

The simplest form of a tie-down device is a ring which is permanently exposed above the frame member. While providing a simple inexpensive tie-down anchor, such an anchor is permanently exposed to cause damage or be damaged even when not needed. One example of a permanently exposed ring is U.S. Pat. No. 2,688,504 which discloses a ring with a T-shaped foot which can be mounted within a complimentary channel fastened to the trailer.

SUMMARY OF THE INVENTION

The present tie-down device is a retractable device for use with a truck trailer especially one having a plurality of stake pockets formed in the frames upper surface and disposed about the perimeter of the trailer. The tie-down device has a housing which extends vertically below the upper surface of the trailer frame. Since trailer frames are normally of a square channel construction the housing will normally be contained within the frame member. The housing will have a pair of apertures located on opposite walls for use in mounting an attachment member.

The attachment member comprises generally a center portion with a pair of V-shaped legs extending outward from the center section. The V-shaped legs are parallel and form a square bail with parallel legs depending therefrom at an acute angle.

A pair of mounting arms extend outward from the V-shaped legs of the attachment member along an axis about which the attachment member will rotate. The mounting arms will engage the apertures in the housing to firmly anchor the attachment member to the frame.

A biasing means is associated with the mounting arms of the attachment member to rotate and bias the attachment member to a retracted position beneath the upper surface of the frame member.

An activating tab is attached to the biasing member and is positioned so that pressure can be applied to the activating tab to overcome the biasing means and rotate the attachment device to an upright position for attachment of a tie-down strap.

DETAILED DESCRIPTION

Figure 1:
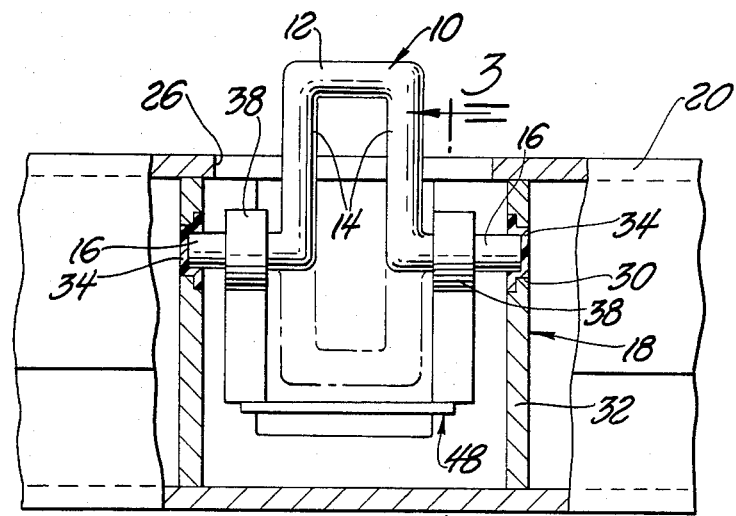
FIG. 1 is a front view of a device according to this invention installed on a truck trailer.
Figure 2:
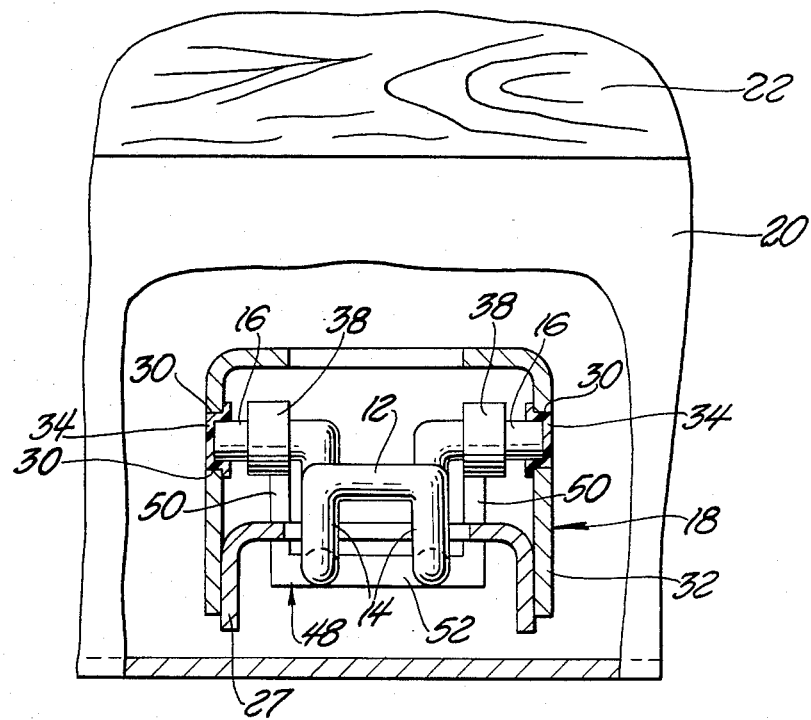
FIG. 2 is a top view of the device of FIG. 1.

Referring to the drawing in which like numerals denote like parts, and initially to FIG. 1, a tie-down appliance according to this invention is shown with an attachment member 10 in the upright attachment position and in the retracted or stored condition (in phantom). The attachment member 10 is mounted within a housing 18 which is attached to and depends vertically from a trailer frame 20. The trailer frame 20 surrounds the trailer bed or deck 22 which is generally formed of wood beams or the like supported on metal I-beams 23. The frame 20 surrounds the deck and provides a solid perimeter to which tie-down straps or chains, not shown, can be anchored. In use a cargo, not shown, would be placed on the deck 22 and tie-down straps would be attached to the load and the attachment member 10 under tension to hold the load firmly in place. As described, the frame member 20 has a plurality of stake pockets 26 formed in the upper surface of the frame and surrounded by a C-shaped metal enclosure 27 to allow the insertion of stakes 28, shown in FIG. 4, into the pockets. The stakes 28 can support a wooden side rack 31 to form a truck with vertical sides.

In greater detail, the attachment member 10 has a center bar 12 with a pair of parallel, spaced V-shaped legs 14 extending from the center bar's ends. The V-shaped legs 14, shown most fully in FIG. 3, and center bar 12 form a U-shaped section suitable for attaching a tie-down chain or strap when the attachment member 10 is rotated into the upright attachment position. A pair of mounting arms 16 extend perpendicularly outward from the ends of the V-shaped legs 14 opposite the center bar 12 to provide an axis about which the attachment 10 can be rotated. The mounting arms 16, extend outward and engage complimentary recesses 30 formed in the sidewalls 32 of housing 18 to rotationally mount the attachment member 10 within the housing. As shown, the recesses 30 have a polymeric bushing 34 disposed within the recess 30 to provide a noncorroding, low friction mounting surface. One example of a usable polymeric bushing material is nylon which is available in a number of grades and hardnesses.

Figure 3:
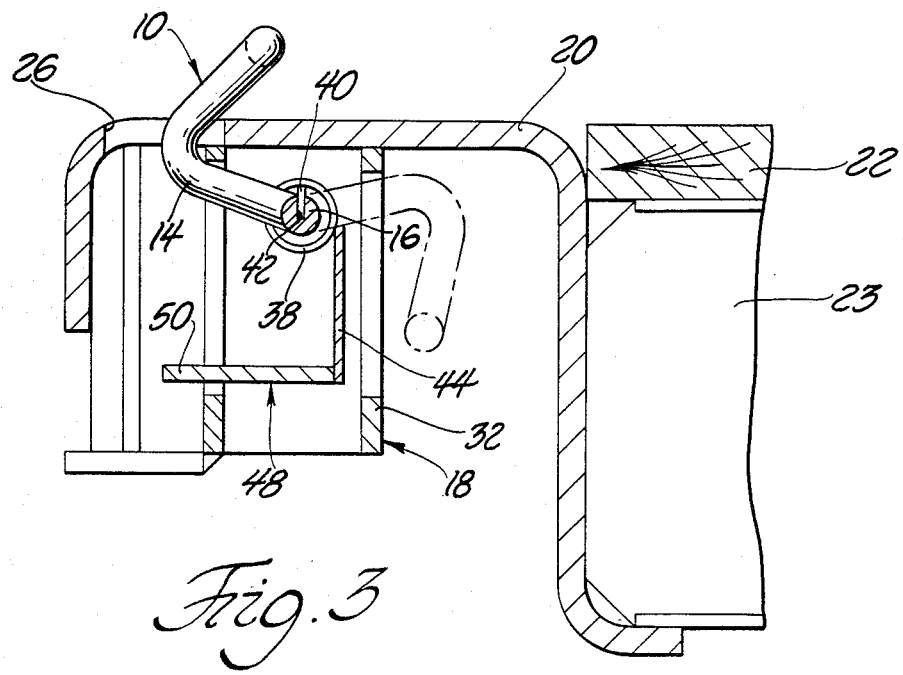
FIG. 3 is a side view of the device of FIG. 1 taken along the line 3—3 of FIG. 1.

According to the invention, biasing means is provided to rotate the attachment member 10 into its storage position within the housing 18 and below the upper surface of the frame 20. In the retracted position, the attachment member 10 will not be exposed to damage from cargo loading or unloading and will not damage the cargo which can be moved over the upper surface of the frame without encountering an obstruction. As shown, a preferred biasing means are a pair of Negator extension springs 38 which are circumferentially disposed about associated mounting arms 16. The end of the spring at the inner wrap of the spring has a tongue 40 projecting into a complimentary groove 42 in the mounting arm 16. As shown in FIG. 3 the spring 38 provides a counterclockwise torsional force which rotates the attachment member 10 into the retracted storage position. The springs have a lead end 44 which extends downward from the spring within the housing 18. One example of a Negator spring structure is found in, *Spring Design* and *Application,* Chironis, N.Y. 1961, p. 162.

Figure 4:
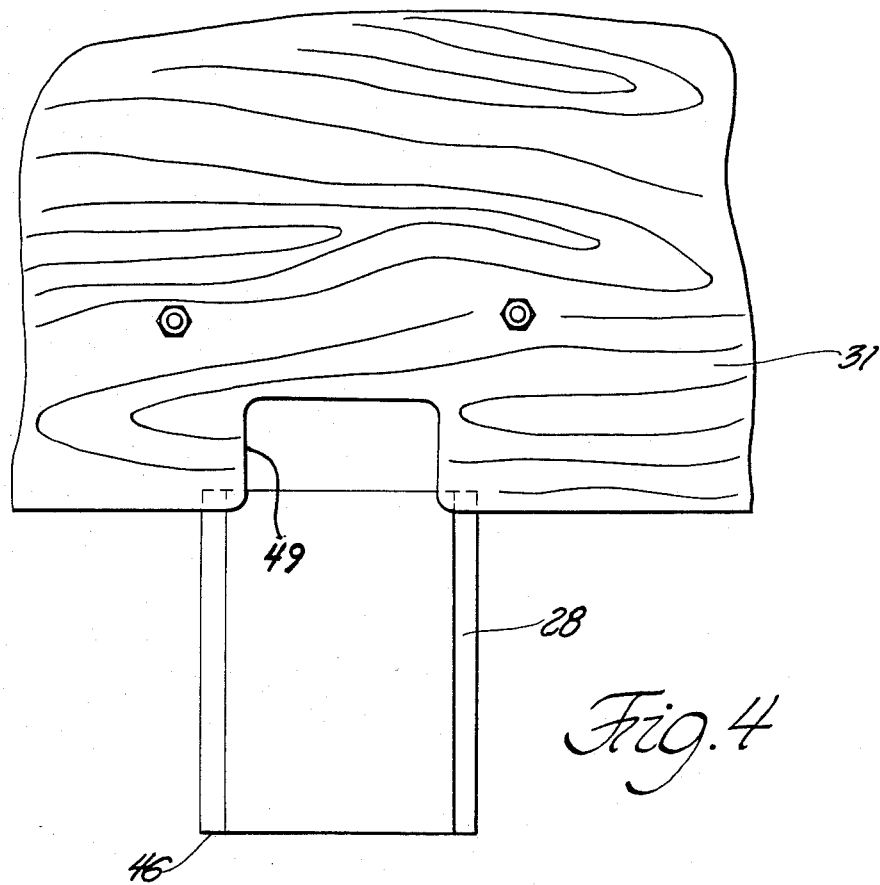
FIG. 4 is a partial inboard view of a side rack panel commonly used on truck trailers modified to work with the invention.

When a cargo is to be tied in position, the attachment member 10 is rotated from its storage position to its attachment position with the center bar 12 and a portion of the V-shaped legs extending above the upper surface of the frame 20 as shown most clearly in FIG. 3. When a side rack or stakes such as those depicted in FIG. 4 are used the stake 28, which has a C-shaped configuration, is inserted into the stake pocket 26 with the open portion of the stake facing the inside of the vehicle. The stake's lower end 46 will contact an activating tab 48 which is attached to the lead end 44 of the spring 38. As the tab 48 is pushed downward by the force, the spring causes the mounting leg 16 to rotate clockwise, as shown in FIG. 3, and thereby the remaining portions of the attachment member 10. The center bar 12 and attached portion of the V-shaped legs 14 will, without interfering with activating tab 48, continue rotating until attachment member 10 passes through side rack opening 49 and reaches the upright position (shown in FIG. 3) forming a bail suitable for attachment of a tie-down strap.

In the structure as shown, the attachment member 10 can be rotated through a substantial arc, on the order of 200–225 degrees by depressing the tab 48 only a couple of inches. This allows the attachment member to function in a small housing compactly disposed under the frame.

Operation of the device was described in conjunction with the insertion of a stake but if the stake were not necessary or desirable, a downward force could be applied to the tab 48 by means of a hand-held section resembling that of the stake, but shorter in length, to rotate the center bar 12 to its exposed usable position. Such a tool could be stored in the vehicle's tool box with the other tools commonly stored as on board equipment.

I wish it to be understood that I do not desire to be limited to the exact details of construction shown and described for obvious modifications will occur to a person skilled in the art, without departing from the spirit and scope of the appended claims.

I claim:

1. A retractable tie-down device adapted for use with a trailer frame to attach tie-down straps for use in securing cargo atop the trailer comprising:
    a shaped attachment having a strap engaging portion with two parallel V-shaped legs extending from a center connecting bar, a pair of mounting arms extending outwardly from the ends of the V-shaped legs opposite the connecting bar;
    a housing mounted below the upper surface of said trailer frame, said housing having mounting apertures therein adapted to receive said mounting arms so as to allow rotation of the attachment;
    biasing means having one end attached to the attachment means and operating to rotate the attachment into a retracted position; and
    an activating tab attached to said biasing means and extending away from said biasing means so that a downward force applied to said activating tab will overcome the biasing means and rotate the shaped attachment about the axis defined by the mounting arms to a position where a portion of the attachment means is above the surface of the trailer for attachment of tie-down straps.

2. The retractable device of claim 1 wherein said biasing means comprises a negator extension spring circumferentially disposed around one of the mounting arms and having a lead end extending below the horizontal axis of the mounting arms.

3. The retractable device of claim 1 wherein a low friction bushing is interposed between the mounting arms and their associated apertures.

4. The retractable device of claim 3 wherein said bushing is a polymeric material.

5. A retractable tie-down device mounted within the stake pockets disposed below the upper surface of a truck trailer frame and adapted for use with tie-down straps for use in securing cargo atop the trailer comprising:
    a housing vertically depending from the upper surface of the frame, said housing having a pair of mounting apertures which are axially aligned with the longitudinal axis of the frame member;
    a shaped attachment member having a center section with two parallel V-shaped legs attached to the center section and a pair of mounting arms attached to the end of the V-shaped legs said mounting arms extending perpendicularly from the V-shaped legs, said mounting arms being adapted to extend through said mounting apertures to rotatably mount the attachment member within said housing;
    a biasing means connected to the shaped attachment member so as to bias the member into a retracted position below the upper surface of said frame; and
    activating means connected to said biasing means so that pressure can be applied to said activating means to negate the biasing means and rotate the center section and a portion of the V-shaped legs through the stake pocket to a position above the upper surface of the frame to allow attachment of a tie-down straps.

6. The retractable tie-down device of claim 5 wherein a low friction, low corrosion bushing is interposed between the mounting arm and the mounting recess.

7. The retractable tie-down device of claim 5 wherein said biasing means is a negator extension spring circumferentially disposed about the mounting arm with a spring tongue in a complimentary slot in the mounting arm, said coil spring applying a torsional force to the mounting arm rotating the attachment member into a retracted position.

8. A retractable tie-down device adapted for use on the framing members of a truck trailer for use with tie-down straps to hold a cargo on the surface of the trailer comprising:
    a shaped attachment having a strap attachment portion with two parallel arms extending from a center section, a pair of spaced parallel mid-arms extending from the band attachment at an acute angle parallel to and in the general direction of the center section, a pair of mounting arms extending outwardly from the ends of the mid-arms opposite the parallel arms;
    a housing having spaced parallel sides mounted within the framing members of the truck trailer, said housing having apertures to receive the mounting arms of the attachment member;

nylon bushings located within the apertures to provide a low friction surface between the mounting arms and brackets;

at least one negator extension spring member disposed circumferentially about the mounting arm said spring being connected to the attachment member and adapted to rotate the attachment member into a retracted position within the framing member, and a second lead end extending to a position below the attaching member;

an activating tab attached to the lead end of said spring, said tab extending towards the perimeter of the frame and positioned so that a downward force applied to the activating tab will overcome the retracting force applied to the attachment member rotating the center section above the upper surface of the frame member to a position where it can be attached to the end of a tie-down strap for restraining cargo.

* * * * *